United States Patent [19]

Yamasaki et al.

[11] 4,446,261

[45] May 1, 1984

[54] PROCESS FOR PREPARATION OF HIGH WATER-ABSORBENT POLYMER BEADS

[75] Inventors: Harumasa Yamasaki; Shoichiro Harada, both of Wakayama, Japan

[73] Assignee: Kao Soap Co., Ltd., Tokyo, Japan

[21] Appl. No.: 360,496

[22] Filed: Mar. 22, 1982

[30] Foreign Application Priority Data

Mar. 25, 1981 [JP] Japan ................................ 56-43488

[51] Int. Cl.$^3$ .......................... C08L 5/00; B01J 31/06
[52] U.S. Cl. ...................................... 524/40; 524/37; 524/38; 524/39; 524/42; 524/457; 524/502; 524/513; 524/733; 523/202; 523/207
[58] Field of Search ...................... 524/27, 35, 37, 38, 524/39, 40, 42, 457, 501, 502, 513, 733; 523/201, 202, 207, 210

[56] References Cited

U.S. PATENT DOCUMENTS 3,498,938  3/1970  Grommers et al. ................... 524/42
4,093,776  6/1978  Aoki et al. .......................... 428/402
4,135,943  1/1979  Morishita et al. ................... 524/733

FOREIGN PATENT DOCUMENTS 50-7826   1/1975  Japan ..................................... 524/40
7309099   1/1974  Netherlands ........................ 524/40

*Primary Examiner*—John Kight, III
*Assistant Examiner*—Nathan M. Nutter
*Attorney, Agent, or Firm*—Flynn, Thiel, Boutell & Tanis

[57] ABSTRACT

Water-insoluble, high water-absorbent polymer beads are prepared by dispersing and suspending an aqueous solution of a water-soluble, ethylenically unsaturated monomer containing a small amount of a crosslinking agent in a dispersion medium of a hydrocarbon or a halogenated aromatic hydrocarbon, carrying out the bead polymerization in the presence of a water-soluble radical polymerization initiator and a protecting colloid comprising a cellulose ester or cellulose ether which is oil-soluble at the polymerization temperature, and separating the resulting beads.

2 Claims, No Drawings

PROCESS FOR PREPARATION OF HIGH WATER-ABSORBENT POLYMER BEADS

The present invention relates to a process for preparing a water-absorbing material which is not soluble in water, highly absorbs a large quantity of an aqueous liquid and holds the absorbed aqueous liquid stably. More particularly, the present invention relates to a process for preparing a highly water-absorbent, bead-like polymer having a high water-absorbing property and a high water-absorbing speed.

Paper, pulp and sponge have heretofore been used as water-absorbing or water-retaining materials for sanitary materials such as sanitary napkins and paper diapers and in the agricultural field. However, these materials are poor in the absorbent capacity and water once absorbed in these materials is substantially squeezed out under pressure. As water-absorbing materials that can be used instead of the foregoing materials, there have recently been proposed hydrolyzed starch-acrylonitrile graft copolymers, modified cellulose ethers and modified polyethylene oxides. However, these materials cannot be regarded as satisfactory water-absorbing materials because the water-absorbing capacity is insufficient, there is a risk of putrefaction owing to use of a natural material as the starting material, or the preparation process is complicated.

We previously proposed a process for the preparation of water-absorbing materials in which these defects are eliminated (see Japanese Patent Publication No. 30710/79).

As the properties ordinarily required for a water-absorbing materials, there can be mentioned (1) a large absorbent capacity, (2) a high absorbency rate, (3) a high gel strength after absorption of water and (4) a good shape-retaining property. Only a material having all of the above properties can be regarded as a satisfactory water-absorbing material.

Water-absorbing materials prepared according to the process disclosed in Japanese Patent Publication No. 30710/79 are still defective in various points.

Since a sorbitan fatty acid ester is used as a protecting colloid in the W/O suspension polymerization process, the particle size of the obtained polymer is very fine and smaller than 100 $\mu$m. A special measure should be taken for preventing dusting when the resulting powder is handled. Furthermore, when the powder is contacted with an aqueous liquid, formation of a difficult-to-dissolve lump of the powder is readily caused and hence, the water-absorbing speed is very low.

We made researches with a view to developing a water-absorbing material having all of the above-mentioned properties while eliminating the foregoing defects, and we found that in the W/O suspension polymerization process comprising dispersing and suspending an aqueous solution of a monomer containing a small quantity of a crosslinking agent in a hydrophobic liquid and conducting polymerization, when a cellulose ester or cellulose ether which is oil-soluble at the polymerization temperature is used as the protecting colloid and a hydrocarbon or a halogenated aromatic hydrocarbon is used as the solvent, the particle size of the obtained polymer is large and exceeds 100 $\mu$m and a water-absorbing material having a high absorbent capacity and a high absorbency rate can be obtained. We have now completed the present invention based on this finding.

More specifically, in accordance with the present invention, there is provided a process for the preparation of highly water-absorbent polymer beads, which comprises dispersing and suspending an aqueous solution of a water-soluble, ethylenically unsaturated monomer containing a small amount of a crosslinking agent in a hydrocarbon or a halogenated aromatic hydrocarbon and performing polymerization by using a water-soluble radical polymerization initiator, said process being characterized in that a cellulose ester or cellulose ether which is oil-soluble at the polymerization temperature is used as a protecting colloid.

The W/O suspension polymerization process using an oil-soluble cellulose ester or cellulose ether as a protecting colloid is disclosed in, for example, Japanese Patent Application Laid-Open Specification No. 7825/80, in which water-soluble sodium polyacrylate or polyacrylamide is mainly prepared. This known technique can be applied to the present invention.

As the water-soluble, ethylenically unsaturated monomer that is used in the present invention, there can be mentioned, for example, acrylic acid, methacrylic acid, salts (such as sodium and ammonium salts) of acrylic acid and methacrylic acid, acrylamide, methacrylamide, N-substituted acrylamides, N-substituted methacrylamides, 2-acryloylethane-sulfonic acid, 2-methacryloylethane-sulfonic acid, salts of 2-acryloylethane-sulfonic acid and 2-methacryloylethane-sulfonic acid, styrene-sulfonic acid, salts of styrene-sulfonic acid, 2-hydroxyethyl acrylate and 2-hydroxyethyl methacrylate.

Sodium acrylate, acrylamide, 2-acrylamido-2-methylpropane-sulfonic acid and sodium styrene-sulfonate are preferred. These monomers may be used in the form of a mixture of two or more of them. In the present invention, it is important that such monomer should be copolymerized with a small amount of a water-soluble crosslinking agent. As the crosslinking agent that is used in the present invention, there can be mentioned, for example, N,N'-methylene-bis-acrylamide, N,N'-methylene-bis-methacrylamide, N-methylolacrylamide, N-methylolmethacrylamide, glycidyl acrylate, glycidyl methacrylate, polyethylene glycol diacrylate, polyethylene glycol dimethacrylate, polyvalent metal salts of acrylic acid and methacrylic acid, phosphoacrylates, phosphomethacrylates, and polyol polyglycidyl ethers such as ethylene glycol diglycidyl ether, glycerin triglycidyl ether, glycerin diglycidyl ether and polyethylene glycol diglycidyl ether. The amount of the crosslinking agent used for obtaining a water-absorbent polymer may be changed in a broad range, but if the amount of the crosslinking agent is large, the swelling property to water is reduced or lost. Accordingly, in the present invention, the crosslinking agent is used in such an amount that the absorbent capacity, defined hereinafter, is 30 to 150 g/g, preferably 50 to 100 g/g. The concrete amount used of the crosslinking agent depends on the kind of the crosslinking agent, but ordinarily, the amount used of the crosslinking agent is about 0.01 to about 5% by weight based on the water-soluble monomer.

The monomer concentration in the aqueous solution of the monomer can be changed within a broad range, but from the economical veiwpoint, it is preferred that the monomer concentration be in the range of from 30% by weight to the saturation concentration, especially from 35% by weight to the saturation concentration.

The cellulose ester or cellulose ether oil-soluble at the polymerization temperature, which is used as the protecting colloid for the W/O suspension polymerization in the present invention, is a cellulose ester or cellulose ether which is insoluble or hardly soluble at room temperature in the hydrocarbon or halogenated aromatic hydrocarbon used as the dispersion medium but becomes soluble in the dispersion medium at the polymerization temperature (higher than 40° C.).

As such cellulose ester or cellulose ether, there can be mentioned, for example, cellulose acetate, cellulose propionate, cellulose butyrate, cellulose acetate propionate, cellulose acetate butyrate, cellulose acetate phthalate, ethyl cellulose, benzyl cellulose and ethylhydroxyethyl cellulose. Cellulose acetate butyrate, ethyl cellulose and ethylhydroxyethyl cellulose are especially preferred.

In the present invention, a hydrocarbon having 6 to 10 carbon atoms or a halogenated aromatic hydrocarbon is preferably used as the dispersion medium. For example, there can be mentioned aromatic hydrocarbons such as benzene, ethylbenzene, toluene and xylene, alicyclic hydrocarbons such as cyclohexane, methylcyclohexane, cyclooctane and decalin, aliphatic hydrocarbons such as hexane, heptane, octane and pentane, and halogenated hydrocarbons such as chlorobenzene, bromobenzene and dichlorobenzene. Toluene, xylene, cyclohexane, methylcyclohexane, hexane, heptane, chlorobenzene and dichlorobenzene are especially preferred. A mixture of two or more of the foregoing solvents may be used as the dispersion medium according to the kind of the cellulose ester or cellulose ether used. Furthermore, a single solvent may be used as the dispersion medium when a certain cellulose ester or cellulose ether is selected and used. In this case, recycling of the dispersion medium is facilitated, and the process is carried out very advantageously from the industrial viewpoint.

When toluene, xylene, ethylbenzene, chlorobenzene or dichlorobenzene is used singly as the dispersion medium, ethyl cellulose having an ethoxy group content of 43 to 47% by weight or cellulose acetate butyrate having a butyryl group content of 20 to 50% by weight is preferably used as the cellulose derivative. When cyclohexane, cyclopentane, methylcyclohexane or decalin is used singly as the dispersion medium, ethyl cellulose having an ethoxy group content of 47 to 50% by weight is preferably used as the cellulose derivative. When n-hexane, n-heptane or n-octane is used singly as the dispersion medium, ethylhydroxyethyl cellulose is preferably used as the cellulose derivative.

The protecting colloid is used in an amount of 0.05 to 10% by weight, preferably 0.5 to 5% by weight, based on the dispersion medium.

The volume ratio between the dispersion medium and the aqueous solution of the monomer can be changed in a broad range, but from the viewpoints of removal of the polymerization heat and control of the polymerization temperature, the above volume ratio is preferably controlled within the range of from 1:1 to 5:1.

For effecting polymerization of the monomer, there is used a known amount of a water-soluble radical polymerization initiator. As the polymerization initiator, there can be mentioned, for example, persulfates such as potassium persulfate and ammonium persulfate, hydroperoxides such as t-butyl hydroperoxide and cumene hydroperoxide, and azo compounds such as 2,2'-azobis-2-amizinopropane hydrochloride. A mixture of two or more of these initiators may be used, and these initiators may be used in the form of a redox type initiator.

The most prominent difference between the present invention and the invention disclosed in Japanese Patent Application Laid-Open Specification No. 7825/80 resides in whether the formed polymer is water-soluble or water-insoluble.

By the term "water-insoluble polymer" used herein is meant a polymer having such characteristics that when the polymer is put in water and the mixture is stirred at room temperature, the polymer absorbs water and is swollen and gelled, and when stirring is stopped and the mixture is allowed to stand still, the flowability is lost or phase separation takes place. By the term "water-soluble polymer" is meant a polymer having such characteristics that when the polymer is added to water and the mixture is stirred, a homogeneous aqueous solution is formed and when stirring is stopped and the solution is allowed to stand still at the same temperature, the homogeneous solution state is maintained.

The polymer prepared according to the present invention is substantially insoluble in water and has such a peculiar property that it absorbs water and retains it therein. In order to impart this property to the formed polymer, it is indispensable that the polymer obtained by using the crosslinking agent should be insolubilized. When a water-soluble polymer is incorporated into the water-insoluble polymer according to the present invention, the absorbency rate is reduced, and the water-absorbed polymer becomes slimy and a dry feel is not given thereto, with the result that handling of the water-absorbed polymer becomes difficult. Accordingly, a water-soluble polymer is excluded from the polymer according to the present invention.

The present invention is advantageous in that since the particle size of the formed polymer is increased, special measures need not be adopted for coping with dusting and since a material having a high absorbent capacity and a high absorbency rate can be obtained, the fields of application of the polymer can be broadened. For example, if the polymer of the present invention is used in combination with a conventional water-retaining agent, water can be removed in a moment from an oil-water mixture.

Namely, the polymer of the present invention can be used not only as a water-removing agent but also as a material of a sanitary product. More specifically, when the polymer of the present invention is used in the field where a large quantity of a liquid such as urine should be absorbed at one time, a material prepared from the polymer of the present invention can absorb the liquid in a moment without leakage or wet feel and no unpleasant feel is left after absorption of the liquid.

The absorbent capacity referred to in the present invention is determined according to the following method. More specifically, about 1 g of the polymer is dispersed in an excess amount of physiological saline solution to swell the polymer sufficiently. Then, the polymer is passed through an 80-mesh sieve. The absorbent capacity is obtained by measuring the weight W of the swollen polymer and dividing the obtained value W by the original weight Wo of the polymer. In short, the absorbent capacity is calculated according to the following formula:

Absorbent capacity (g/g) = W/Wo

The absorbency rate is expressed by the time required for 0.5 g of the polymer to absorb 5 ml of physiological saline solution.

The present invention will now be described in detail with reference to the following Examples and Comparative Examples.

The contents of acetyl, butyryl and ethoxy groups in the cellulose ester and cellulose ether used in these Examples are as follows:

Cellulose acetate butyrate (CAB 381-20 manufactured by Eastman Kodak Co.):
acetyl group content=13% by weight, butyryl group content=37% by weight Ethyl cellulose (N-200 manufactured by Hercules Co.):
ethoxy group content=47.5–49.0% by weight

EXAMPLE 1

A 2-liter capacity, 4-neck, round-bottom flask equipped with a stirrer, a reflux cooler, a dropping funnel and a nitrogen gas-introducing tube was charged with 1150 ml of cyclohexane and 9.0 g of ethyl cellulose (Ethyl Cellulose N-200 manufactured and supplied by Hercules Co.), and nitrogen gas was blown into the flask to expel oxygen therefrom and the temperature was elevated to 75° C. Separately, in a flask, 150 g of acrylic acid was neutralized with 65.8 g of 98% caustic sodium hydroxide dissolved in 200 g of deionized water while cooling the charge from the outside. The monomer concentration in the aqueous phase was 45% by weight. Then, 0.5 g of potassium persulfate and 0.15 g (0.1% by weight based on acrylic acid) of N,N'-methylene-bis-acrylamide were dissolved in the aqueous solution, and nitrogen gas was blown to expel oxygen present in the aqueous solution. The solution in the flask was dropped into the charge of the above-mentioned 4-neck flask over a period of 1 hour. After completion of the dropwise addition, reaction was carried out at 75° C. for 1 hour. Cyclohexane was removed by distillation under reduced pressure, and the residual swollen polymer was dried under reduced pressure at 80° to 100° C. to obtain spherical particles in which the central particle size was 100 to 350 μm.

EXAMPLE 2

The procedures of Example 1 were repeated in the same manner except that 0.75 g (0.5% by weight based on acrylic acid) of polyethylene glycol diglycidyl ether (n=9) was incorporated and dissolved as the crosslinking agent in the aqueous solution of the monomer, whereby spherical particles having a central particle size of 100 to 350 μm were obtained.

EXAMPLE 3

The procedures of Example 1 were repeated in the same manner except that 3 g (2% by weight based on acrylic acid) of polyethylene glycol dimethacrylate (n=14) was dissolved as the crosslinking agent in the solution of the monomer and 110 g of deionized water was further added to the monomer solution. The monomer concentration in the aqueous phase was 35% by weight.

Thus, there were obtained spherical particles in which the central particle size was 100 to 420 μm.

EXAMPLE 4

The same polymerization vessel as used in Example 1 was charged with 1150 ml of hexane and 13.02 g of ethylhydroxyethyl cellulose (EHEC Low supplied by Hercules Co.), and the temperature was elevated to 65° C. Separately, in a flask, 130 g of acrylic acid and 20 g of 2-acrylamido-2-methylpropane-sulfonic acid were neutralized with 61.0 g of 98% caustic sodium hydroxide dissolved in 220 g of deionized water. Furthermore, 0.5 g of ammonium persulfate and 0.75 g (0.5% by weight based on the monomer) of N-methylolacrylamide were incorporated and dissolved in the solution to form an aqueous monomer solution. The monomer concentration in the aqueous phase was about 42% by weight.

Then, the procedures of Example 1 were repeated in the same manner to obtain spherical particles in which the central particle size was 100 to 350 μm.

EXAMPLE 5

The procedures of Example 4 were repeated in the same manner except that 120 g of acrylic acid was neutralized with 51.0 g of 98% caustic sodium hydroxide dissolved in 250 g of deionized water and then, 30 g of acrylamide, 4.5 g (3% by weight based on the monomer) of polyethylene glycol dimethacrylate (n=23) and 0.3 g of potassium persulfate were further dissolved to form a monomer solution. The monomer concentration in the aqueous phase was 40% by weight. Thus, there were obtained spherical particles where the central particle size was 100 to 300 μm.

EXAMPLE 6

The same polymerization vessel as used in Example 1 was charged with 1150 ml of monochlorobenzene and 11.5 g of cellulose acetate butyrate (CAB 381-20 supplied by Eastman Kodak Co.), and the temperature was elevated to 80° C. Separately, in a flask, a monomer solution was prepared from 100 g of acrylamide, 50 g of sodium styrene-sulfonate, 1% by weight based on the monomer of polyethylene glycol diacrylate (n=9), 280 g of deionized water and 0.3 g of ammonium persulfate. The monomer concentration in the aqueous phase was 35% by weight. The subsequent treatments were conducted in the same manner as described in Example 1.

COMPARATIVE EXAMPLE 1

A water-insoluble spherical polymer was obtained according to the process disclosed in Example 1 of Japanese Patent Publication No. 30710/79, which corresponds to U.S. Pat. No. 4,093,776. More specifically, in the polymerization recipe described in Example 1 of the present invention, sorbitan monostearate was used as the protecting colloid and polymerization was carried out in the absence of the crosslinking agent. The central particle size of the obtained polymer was 10 to 70 μm.

COMPARATIVE EXAMPLE 2

In the polymerization recipe of Example 1, sorbitan distearate was used as the protecting colloid. Polymerization was carried out in the same manner as described in Example 1. The central particle size of the obtained polymer was 10 to 70 μm.

COMPARATIVE EXAMPLE 3

Polymerization was carried out in the same manner as described in Example 3 except that in the polymerization recipe of Example 3, sorbitan monopalmitate was used as the protecting colloid and 9 g (6% by weight based on acrylic acid) of polyethylene glycol dimethacrylate (n=14) was used as the crosslinking agent. The central particle size of the formed polymer was 10 to 70 μm.

COMPARATIVE EXAMPLE 4

Polymerization was carried out in the same manner as in Example 3, except that polyethyleneglycol dimethacrylate (n=14) was not used. The obtained polymer particles had a central size of 100 to 450 μm, but were very sticky because they contained a large amount of the water-soluble polymer.

COMPARATIVE EXAMPLE 5

Polymerization was conducted in the same manner as in Example 6, except that polyethyleneglycol diacrylate (n=9) was not used. The obtained polymer particles had a central size of 100 to 250 μm, but were very sticky because of they contained a large amount of the water-soluble polymer.

Absorbent capacity and absorbency rate of the polymers obtained in Examples 1 through 6 and Comparative Examples 1 through 5 are shown in Table 1.

TABLE 1

| Run No. | Absorbent Capacity (g/g) | Absorbency rate |
| --- | --- | --- |
| Example 1 | 58 | 4 minutes and 10 seconds |
| Example 2 | 52 | 4 minutes and 5 seconds |
| Example 3 | 63 | 5 minutes |
| Example 4 | 60 | 4 minutes and 30 seconds |
| Example 5 | 68 | 4 minutes and 50 seconds |
| Example 6 | 57 | 4 minutes and 25 seconds |
| Comparative Example 1 | 54 | 16 minutes and 40 seconds |
| Comparative Example 2 | 38 | 5 minutes |
| Comparative Example 3 | 20 | 7 minutes and 30 seconds |
| Comparative Example 4 | could not be measured | longer than 30 minutes |
| Comparative Example 5 | could not be measured | longer than 30 minutes |

The embodiments of the invention in which an exclusive property or privilege is claimed are defined as follows:

1. A process for preparing beads consisting of water-insoluble, crosslinked polymer, which beads have a particle size of from 100 to 1000 microns and have an absorbent capacity for physiological saline in the range of from 30 to 150 grams per one gram of the dried polymer, which consists of the steps of: dispersing droplets of (1) an aqueous solution consisting of water-soluble, ethylenically unsaturated monomer, from 0.01 to 5% by weight, based on the weight of said monomer, of water-soluble crosslinking agent, a water-soluble radical polymerization initiator, and the balance is water, said aqueous solution containing from 30 wt.% up to the saturation concentration of said monomer, into (2) a liquid dispersion medium having a temperature of higher than 40° C., said liquid dispersion medium consisting of an oil material selected from the group consisting of hydrocarbons having from 6 to 10 carbon atoms and halogenated aromatic hydrocarbons, and said oil material having dissolved therein from 0.05 to 10% by weight, based on the weight of said oil material, of a protective colloid selected from the group consisting of cellulose esters and cellulose ethers which are not soluble in said oil material at room temperature but are soluble in said oil material at a temperature of higher than 40° C., whereby to form a W/O suspension of said droplets in said liquid dispersion medium, the volumetric ratio of said dispersion medium/said aqueous solution being in the range of 1:1 to 5:1; suspension polymerizing said monomer, at a temperature higher than 40° C. in the presence of said crosslinking agent and said radical polymerization initiator, whereby to form said beads; and then recovering said beads from said liquid dispersion medium.

2. Water-insoluble, highly water-absorbent polymer beads which consist of a water-insoluble, crosslinked polymer, which beads have a particle size of at least 100 microns and have an absorbent capacity for physiological saline in the range of from 30 to 150 grams per one gram of the dried polymer, which beads are prepared by a process consisting essentially of the steps of: dispersing droplets of (1) an aqueous solution consisting essentially of water-soluble, ethylenically unsaturated monomer, water-soluble crosslinking agent, a water-soluble radical polymerization initiator and the balance is essentially water, into (2) a liquid dispersion medium having a temperature of higher than 40° C., said liquid dispersion medium consisting essentially of an oil material selected from the group consisting of hydrocarbons and halogenated aromatic hydrocarbons, said oil material having dissolved therein a protective colloid selected from the group consisting of cellulose esters and cellulose ethers which are not soluble in said oil material at room temperature but are soluble in said oil material at a temperature of higher than 40° C., whereby to form a W/O suspension of said droplets in said liquid dispersion medium; suspension polymerizing said monomer, at a temperature higher than 40° C. in the presence of said crosslinking agent and said radical polymerization initiator, whereby to form said beads; and then recovering said beads from said liquid dispersion medium.

* * * * *